United States Patent
T

(10) Patent No.: US 11,283,711 B2
(45) Date of Patent: Mar. 22, 2022

(54) EFFICIENT VPN ROUTE REFRESH MECHANISM FOR BGP BASED VPN TECHNOLOGIES

(71) Applicant: Telefonaktiebolaget LM Ericsson (publ), Stockholm (SE)

(72) Inventor: Anupkumar T, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 527 days.

(21) Appl. No.: 16/316,611

(22) PCT Filed: Jul. 25, 2016

(86) PCT No.: PCT/IB2016/054433
§ 371 (c)(1),
(2) Date: Jan. 9, 2019

(87) PCT Pub. No.: WO2018/020293
PCT Pub. Date: Feb. 1, 2018

(65) Prior Publication Data
US 2019/0238457 A1 Aug. 1, 2019

(51) Int. Cl.
*G06F 15/173* (2006.01)
*H04L 45/64* (2022.01)
(Continued)

(52) U.S. Cl.
CPC ............ *H04L 45/64* (2013.01); *H04L 45/023* (2013.01); *H04L 45/025* (2013.01); *H04L 45/04* (2013.01);
(Continued)

(58) Field of Classification Search
CPC ..... H04L 45/64; H04L 45/023; H04L 45/025; H04L 45/04; H04L 45/54; H04L 45/742; H04L 45/745; H04L 63/0272
See application file for complete search history.

(56) References Cited

U.S. PATENT DOCUMENTS 9,106,530 B1 * 8/2015 Wang ................. H04L 12/4641
2003/0112809 A1 * 6/2003 Bharali ................. H04L 45/64
370/400

(Continued)

OTHER PUBLICATIONS

Dong, et al., "Constrained Route Distribution for BGP based Virtual Private Networks (VPNs); draft-dong-idr-vpn-route-constrain-02.txt," IETF Network Working Group, Internet Draft, Sep. 27, 2010, pp. 1-21.

(Continued)

*Primary Examiner* — Oleg Survillo
(74) *Attorney, Agent, or Firm* — Sage Patent Group

(57) ABSTRACT

A method is implemented by a network device to optimize the operation of a virtual private network (VPN) route refresh for border gateway protocol (BGP). The method reduces a span of VPN databases to be traversed to perform a route target constraint (RTC) update at the network device. The method includes receiving an RTC add or delete from a BGP peer, looking up each route target (RT) in a route target-route distinguisher (RT-RD) map to get a set of route distinguishers (RDs), and generating a VPN update for each VPN Address Family (AF) and each RD in the RD cache and sending the VPN update to a respective BGP peer.

16 Claims, 7 Drawing Sheets

(51) Int. Cl.
*H04L 45/023* (2022.01)
*H04L 45/02* (2022.01)
*H04L 45/00* (2022.01)
*H04L 45/74* (2022.01)
*H04L 45/745* (2022.01)
*H04L 29/06* (2006.01)

(52) U.S. Cl.
CPC ............ *H04L 45/54* (2013.01); *H04L 45/742* (2013.01); *H04L 45/745* (2013.01); *H04L 63/0272* (2013.01)

(56) References Cited

U.S. PATENT DOCUMENTS

| | | | | |
|---|---|---|---|---|
| 2009/0279557 A1* | 11/2009 | Wang | ...................... | H04L 45/22 370/401 |
| 2010/0080228 A1* | 4/2010 | Kwapniewski | ......... | H04L 45/00 370/392 |
| 2012/0252443 A1* | 10/2012 | Zheng | ................... | H04W 48/18 455/426.1 |
| 2014/0087717 A1* | 3/2014 | Cherian | ................ | H04W 24/10 455/422.1 |
| 2016/0248658 A1* | 8/2016 | Patel | ..................... | H04L 45/127 |
| 2016/0381015 A1* | 12/2016 | Ravinutala | .......... | H04L 63/0272 726/7 |
| 2017/0093641 A1* | 3/2017 | Utgikar | .................. | H04L 45/04 |

OTHER PUBLICATIONS

RFC 4684: Marques, et al., "Constrained Route Distribution for Border Gateway Protocol/MultiProtocol Label Switching (BGP/MPLS) Internet Protocol (IP) Virtual Private Networks (VPNs)," The IETF Trust Network Working Group, Request for Comments: 4684, Nov. 2006, pp. 1-14.

* cited by examiner

EFFICIENT VPN ROUTE REFRESH MECHANISM FOR BGP BASED VPN TECHNOLOGIES

CROSS-REFERENCE TO RELATED APPLICATIONS

This application is a national stage of International Application No. PCT/IB2016/054433, filed Jul. 25, 2016, which is hereby incorporated by reference.

TECHNICAL FIELD

Embodiments of the invention relate to the field of virtual private network (VPN) networks and border gateway protocol (BGP); and more specifically, to a process for optimizing the exchange of VPN route information between BGP peers.

BACKGROUND

Border Gateway Protocol is a standardized gateway protocol for exchanging routing information and reachability information among autonomous systems (AS) on the Internet. BGP makes routing decisions based on available paths, network load and network policies. BGP may be implemented by network devices (e.g., routers) that communicate with one another by establishing transmission control protocol (TCP) sessions between the neighboring network devices implementing BPG, referred to as BGP peers. A given BGP router may receive network layer reachability information (NLRI), which it shares with its peers though that sharing may be selective. Each BGP router utilizes this information to update its routing tables and determine available paths to reach various destinations.

Virtual private networks are private networks that extend across a public network or the Internet. The use of VPNs enables the transmission of data across the public or shared network between computing devices as though those computing devices were on a separate private network. BGP routers support VPN and where NLRI and route data is received at a BGP router from a computing device in the VPN it may be shared amongst BGP peers that are also supporting the VPN, however, to maintain the privacy of such information of the VPN this information may be separated from other routing information for other VPNs and public networks. In some instances, this routing information can be selectively shared between VPNs by the BGP peers.

To distinguish between various VPNs and the routing information associated with each VPN as it is shared amongst the BGP peers an identifier for each VPN called a route distinguisher (RD) can be utilized. The RD is a unique number that can be prepended to each route of a VPN to identify that route as belonging to a particular VPN or the customer that controls that VPN. Similarly, there are cases where routing information is to be shared between VPNs and the designation of such sharing, also referred to herein as subscriptions, can be via the use of a route target (RT). The RT is an identifier that identifies a BGP community that can be used to share routing information with the members of the BGP community. Each VPN that is associated with the RT can receive the routing information designated or shared with the RT. Route target constraints (RTCs) is a mechanism by which the BGP peers advertise to one another which RTs they wish to receive. Thus, the BGP peer can avoid sending routing information for an RT that a BGP peer is not in need of thereby reducing traffic for maintaining up to date routing information. Maintaining the routing information and sending only the requested routing information for specified RTs requires tracking of the RT information amongst the BGP peers which can be computationally intensive.

SUMMARY

In one embodiment, a method is implemented by a network device to optimize the operation of a virtual private network (VPN) route refresh for border gateway protocol (BGP). The method reduces span of VPN databases to be traversed to perform VPN route refresh at the network device. The method includes receiving an RTC add or delete from a BGP peer, looking up each route target (RT) in a route target-route distinguisher (RT-RD) map to get a set of route distinguishers (RDs), and generating a VPN update for each VPN Address Family (AF) and each RD in the RD cache and sending the VPN update to a respective BGP peer.

In another embodiment, a network device is provided that optimizes the VPN route refresh for BGP. The network device reduces the span of VPN databases to be traversed to perform VPN route refresh at the network device. The network device includes a non-transitory computer readable medium having stored therein a VPN route refresher, and a processor coupled to the non-transitory computer readable medium. The processor executes the VPN route refresher. The VPN route refresher receives an RTC add or delete from a BGP peer, looks up each RT in a RT-RD map to get a set of RDs, and generates a VPN update for each VPN Address Family and each RD in the RD cache and sending the VPN update to a respective BGP peer.

In another embodiment, a computing device implements a plurality of virtual machines for implementing network function virtualization (NFV), wherein a virtual machine from the plurality of virtual machines is configured to execute the method to optimize the operation of a VPN route refresh for BGP. The computing device reduces the span of VPN databases to be traversed to perform VPN route refresh at the computing device. The computing device includes a non-transitory computer readable medium having stored therein a VPN route refresher, and a processor coupled to the non-transitory computer readable medium. The processor executes the virtual machine from the plurality of virtual machines. The virtual machine executes the VPN route refresher. The VPN route refresher receives an RTC add or delete from a BGP peer, looks up each RT in a RT-RD map to get a set of RDs, and generates a VPN update for each VPN Address Family and each RD in the RD cache and sending the VPN update to a respective BGP peer.

A control plane device configured to implement at least one centralized control plane for a software defined networking (SDN) network, the centralized control plane configured to execute a method to optimize the operation of a VPN route refresh for BGP. The control plane device to reduce the span of VPN databases to be traversed to perform VPN route refresh at the control plane device. The control plane device a non-transitory computer readable medium having stored therein a VPN route refresher, and a processor coupled to the non-transitory computer readable medium. The processor to execute the VPN route refresher. The VPN route refresher receives an RTC add or delete from a BGP peer, looks up each RT in a RT-RD map to get a set of route distinguishers RDs, and generates a VPN update for each VPN Address Family AF and each RD in the RD cache and sending the VPN update to a respective BGP peer.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
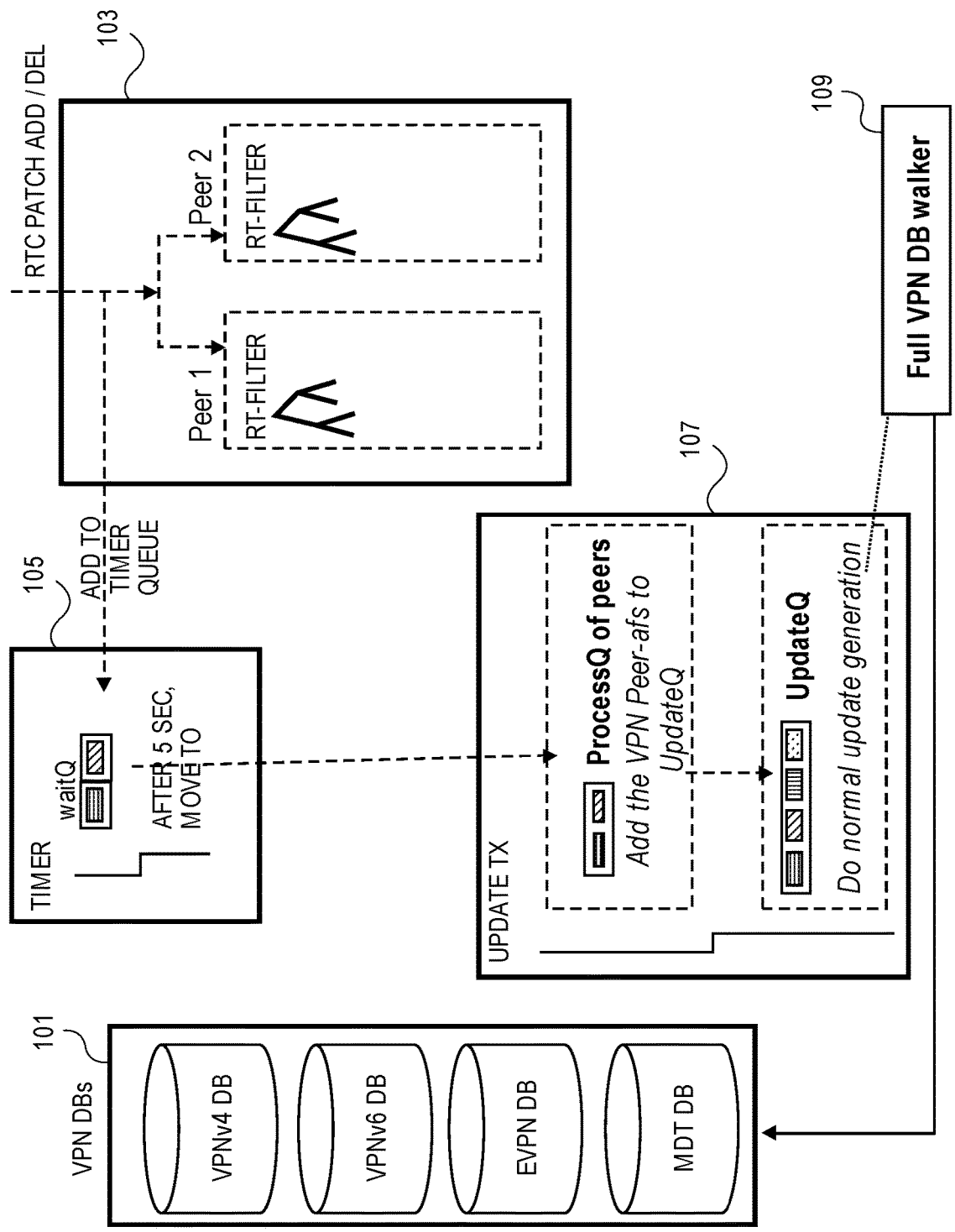
FIG. 1 is a diagram of one embodiment of the architecture and operation of a VPN route refresh for BGP.

The following description describes methods and apparatus for an optimized route refresh process in BGP for virtual private network (VPN) routes. The embodiments provide an optimized process to minimize the scan through a set of VPN databases at each BGP. In order to avoid the scanning of all VPN routes in the local VPN databases of each BGP router, the BGP VPN architecture is extended with a new mapping table that maps every route target (RT) extended community (Extcomm) in the VPN routes to the VPN route distinguishers (RDs) containing the VPN routes. The mapping table is called an RT-RD Map. When subscriptions (i.e., RTs) arrive from BGP VPN peers, the BGP process accesses and utilizes the added mapping table (i.e., the RT-RD Map) to get the list of VPN RDs (that identify VPN databases) that hold the VPN routes of interest, and sends only those VPN routes retrieved from these VPN RDs to the BGP peer. In some embodiments, the BGP architecture can be further extended to include a quick lookup cache per BGP peer. The quick lookup cache contains the VPN RDs (databases of interest) deduced from the mapping table (RT-RD Map) only to be scanned for a particular BGP peer.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments provide an optimization to the border gateway protocol (BGP) virtual private network (VPN) route refresh mechanism, which is responsible for keeping routing information current for each VPN between neighboring BGP peers. The existing BGP VPN Route Refresh mechanism begins with each BGP peers starting up and generating a session with each of its BGP peers. Each BGP peer is executed by a network device or similar computing device and can each support any number of VPNs. The sessions between the BGP peers can be transmission control protocol (TCP) or similar communication sessions.

Each BGP peer exchanges route targets, also referred to as subscriptions,' with each of its peers, which define the interests in the routes for designated VPNs. Subsequently, each BGP peer sends only routing information for VPNs that match the RT or subscriptions provided by a BGP peer. Overtime the RTs or subscription may be changed or updated as the membership or configuration of VPNs change.

When a new subscription is sent from the BGP VPN Peer, then the receiving router will not know as to which of the many VPNs contains the routes that match the incoming subscription. Thus, in response to receiving a new RT, the existing implementations of VPN route refresh will visit all VPN routes in all of the local VPN databases for the purpose of finding and sending out routes to the BGP peer that sent the RT, which match the new RT/subscription. This process of visiting all VPN routes in the local VPN databases is a computational intensive process for BGP. When a BGP router such as a provider edge (PE) router hosts a large number of VPNs with a large number of routes associated with those VPNs (e.g., a PE may host 4,000 VPNs and four million VPN routes), visiting all these VPN routes is a burden on the computational power of the network device, as the entire set of VPN databases has to be walked. This is nonetheless the result of the current VPN route refresh process.

The embodiments overcome these limitations of the prior art by providing an optimized process to minimize the search through the set of VPN databases at each BGP peer. In order to avoid the searching or 'visiting' of all VPN routes in the local VPN databases of each BGP peer, the embodiments provide a process wherein the BGP VPN architecture is extended with a new mapping table that maps every VPN subscription (i.e., each RT) coming from each BGP peer to the VPNs (indicated by RDs) containing the interested routes. When the subscriptions arrive from the BGP VPN peers, instead of doing searching all VPN routes (i.e., "visit all"), the BGP process accesses and utilizes the added mapping table, called RT-RD Map, to get the list of VPN RDs that hold the VPN routes of interest, and sends only those VPN routes retrieved from these databases (indicated by RDs) to the peer. In addition, since RTs/subscriptions can come from multiple BGP peers, the optimized process can store the interested set of VPN RDs for each peer separately. In this regard, the architecture can include a quick lookup caches per BGP peer. The quick look up cache identifies the VPN RDs of interest to be visited for a particular BGP peer only. This keeps each quick look up cache small and localized to the BGP peer, which helps in faster VPN route refresh per peer.

Thus, the embodiments provide advantages over the prior art by avoiding searching or 'visiting' each available VPN database, instead identifying the required portion, span or extent of VPN databases to be visited. Hence, the embodiments save compute (i.e., central processing unit (CPU) or similar processor) cycles for the BGP process. In addition, since the embodiments send only interested VPN routes, and not all VPN routes, it saves network bandwidth. With less compute resources spent on search of VPN databases and sending of unnecessary VPN routes, the embodiments, in turn improve convergence for VPN destination routes as more compute resources will be available and they will be available with less lag after changes to the databases caused by new received RTs.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a diagram of one embodiment of the architecture and operation of a VPN route refresh for BGP. In the example architecture the basic VPN route refresh process is shown. The process may be initiated upon the receipt of a route target constraint (RTC) add or delete message from a BGP peer. The set of RTCs received from a BGP peer can be stored in a local cache 103, known as an RT Filter, per BPG peer. The cache 103 can be structured as an index, hashtable, tree or similarly organized data structure. The cache may also have the ability to return the recently added or deleted RTCs since last time it was visited.

After a defined delay the RTC add or deletes received from a BGP peer are processed by a timer 105 which, upon expiration, triggers an update transaction 107 for generating VPN updates. The timer serves to batch or group the RTC adds and deletes that are received during the time period of the timer. For each VPN Address Family (AF), its local VPN database 101 is fully scanned and the routes are sent towards the BGP peer. Thus, the full set of VPN databases are searched as part of a full VPN database walker 109 process. Any number and size of VPN databases 101 can be present in the architecture. VPN databases can include differing VPN versions (e.g., VPNv4, VPNv6), differing VPN technologies (e.g., Ethernet over VPN (EVPN) and multicast distribution tree (MDT)) and similar VPN databases that track per VPN routes.

Figure 2:
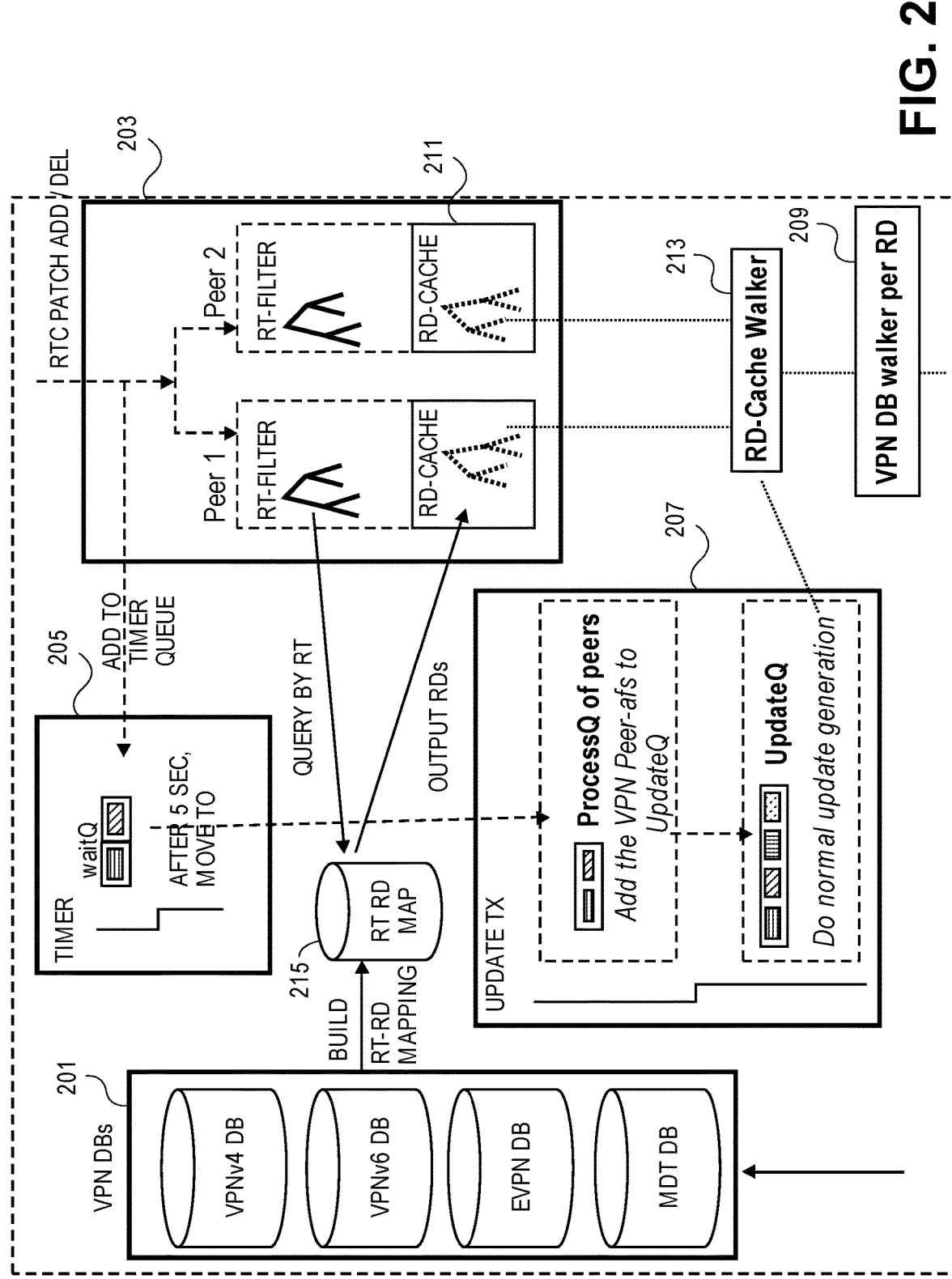
FIG. 2 is a diagram of one embodiment of the architecture and operation of the VPN route refresh for BGP.

FIG. 2 is a diagram of one embodiment of the architecture and operation of the VPN route refresh for BGP. In the example architecture the optimized VPN route refresh process is shown. The process may be initiated upon the receipt of a route target constraint add or delete message from a BGP peer. The RTCs added or deleted can be obtained from a local cache 203, known as the RT filter. The cache 203 can be structured as an index or hashtable or tree or similarly organized to store received RTCs.

In addition, a per peer cache of route designators (RDs) 211 is maintained. The RD cache 211 is a tree or similar data structure of the RDs obtained from the RT-RD map (discussed herein below) for each of the RTs received from the associated BGP peer. The RD cache 211 is maintained per BGP peer. All VPN AFs under the peer may share the same RD-cache 211. The BGP process knows what RDs to search or 'walk' for each VPN AF during the VPN update generation. Further, the BGP process stores the state of a 'walk' (i.e., a traversal) in each VPN AF so that the walk can resume searches at specific points in the data structure of the RD cache 211.

After a defined delay the received RTC add or deletes are processed by a timer which, upon expiry, triggers an update transaction 207 for generating VPN updates. The timer serves to batch or group the updates that are received during the time period of the timer. The process performs a lookup in the RT-RD map using the changed RTs as a key to obtain a set of RDs. The RT-RD map is built using the RTs and RDs in the VPN paths from each of the VPN databases. The set of changed RTs is determined using the incoming RTC add or delete and the per peer RT filter to identify the changes in RTs for each BGP peer. An example structure of an RT-RD map is shown in FIG. 3.

Figure 3:
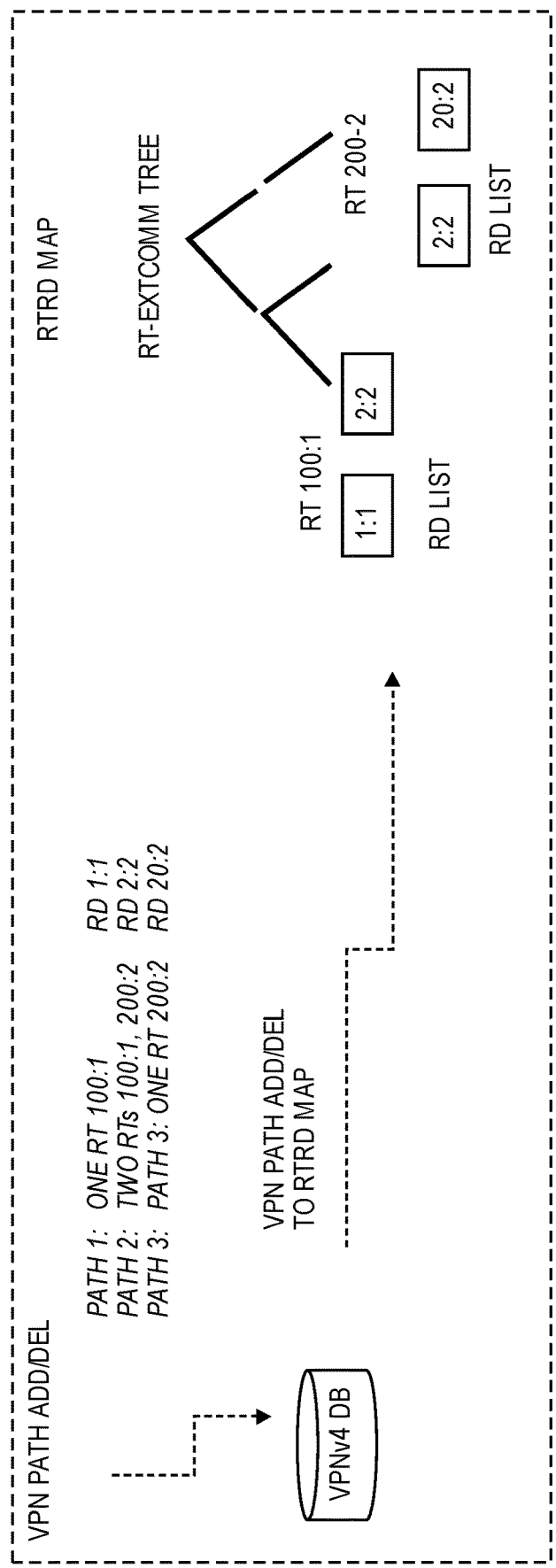
FIG. 3 is a diagram of one example embodiment of the structure of an RT RD map.

FIG. 3 is a diagram of one example embodiment of the structure of an RT RD map. As VPN paths are added to and/or deleted from each VPN DB (VPNv4 is illustrated, however the RT RD spans all of the available VPN databases), the RT and RD from these updates are extracted for a given VPN path. The RT and RD related by a VPN path are used them to update the mapping info between RTs and RDs in the RT RD map. In some embodiments, as illustrated in FIG. 3, this mapping info is stored in a tree or similar data structure. In the illustrated example, the data is stored as a radix tree of RTs, each RT holding a list of RDs. A lookup on this map using the RT as a key returns the list of RDs which have VPN paths carrying that RT.

Returning to the discussion of FIG. 3, with the RD information returned for each received RT, the RD cache 211 can be updated with the returned RD information. The RD cache 211 information can be used by the RD cache walker 213 to identify each VPN. The identified VPN is searched by the VPN database walker 209 and the resulting VPN route refreshes are sent toward the associated peers. In the optimized process, the full set of VPN databases are not searched, rather only the VPN databases identified by RDs in the RD cache are searched by the VPN database walker 209 process. As with the basic process, any number and size of VPN databases 201 can be present in the architecture. VPN databases can include differing VPN versions (e.g., VPNv4, VPNv6), differing VPN technologies (e.g., Ethernet over VPN (EVPN) and multicast distribution tree (MDT)) and similar VPN databases that track per VPN routes.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4:
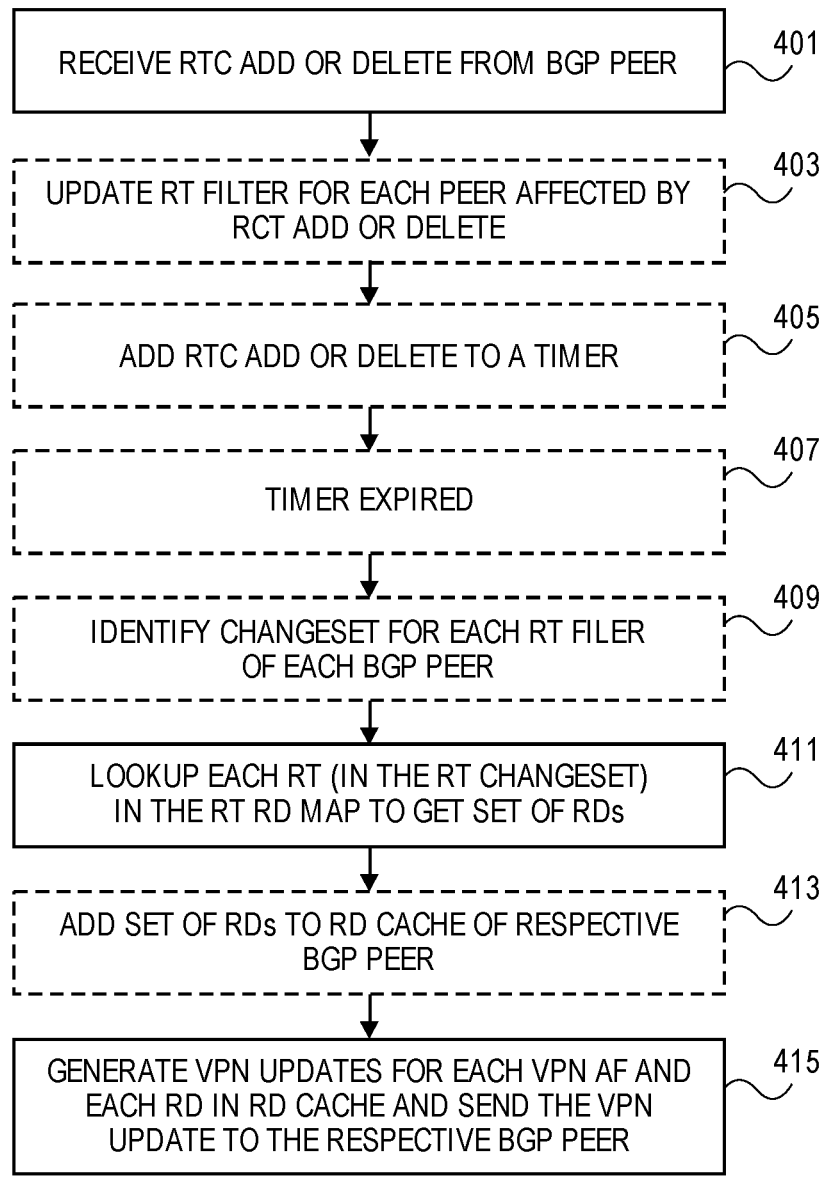
FIG. 4 is a flowchart of one embodiment of the process for the VPN route refresh in BGP.

FIG. 4 is a flowchart of one embodiment of the process for the VPN route refresh process for BGP. The process may be implemented by a VPN route refresh manager or similar component working in coordination with BGP. The process for optimized VPN route refreshed may be initiated by the receipt of an RTC add or delete from a BGP peer (Block 401). In some embodiments, the RTC includes a set of RTs to be added or deleted on a per peer basis and this information is used to update a RT filter for each corresponding BGP peer (Bock 403). The RTC is added to or associated with a timer to enable grouping of batching of received RT changes to be processed together (Block 405). After a delay of a predefined period has expired (Block 407), the RTC add or delete is moved to an update transaction process.

The update process identifies a changeset of RTs that have been added or deleted recently in the RT filter of each BGP peer (Block 409), that is, since it was last visited. Thus, in some embodiments, the set of RTs identified by the RTC add or delete is compared against existing RT filters to identify the changeset. In other embodiments, the RT filters can be versioned and changed between versions can be tracked or derived. Each RT that has changed and is in the changeset can be looked up in the RT RD map to get a set of corresponding RDs (Block 411). Using the set of returned RDs the per BGP peer RD cache is updated to include the set of RDs (Block 413). Then a VPN update is generated to include VPN paths for each VPN AF and each RD in the RD cache for the BGP peer. This VPN update can be generated with the VPN path information retrieved from the identified RD caches thereby avoiding having to traverse each of the available VPN databases. The VPN updates are then sent toward each of the affected BGP peers (Block 415).

Thus, the embodiments provide a process and system whereby the RT-RD mapping table is built by an examination of the VPN databases in coordination with the BGP process. This helps in mapping RTs or subscriptions to source VPN databases. The embodiments can also encompass the provisioning of RD caches that can be quick lookup caches where the RD caches are per peer in the BGP process. This helps in storing interested VPN databases for a given RT or subscription. The RT-RD mapping tables and lookup caches are general to BGP. Any BGP based application that uses VPN subscriptions can take advantage of these structures and benefit from the embodiments. For example, the embodiments may encompass BGP based applications using level 3 VPN (L3VPN), Ethernet VPN (EVPN), multicast, and multicast distribution trees (MDTs).

Figure 5A:
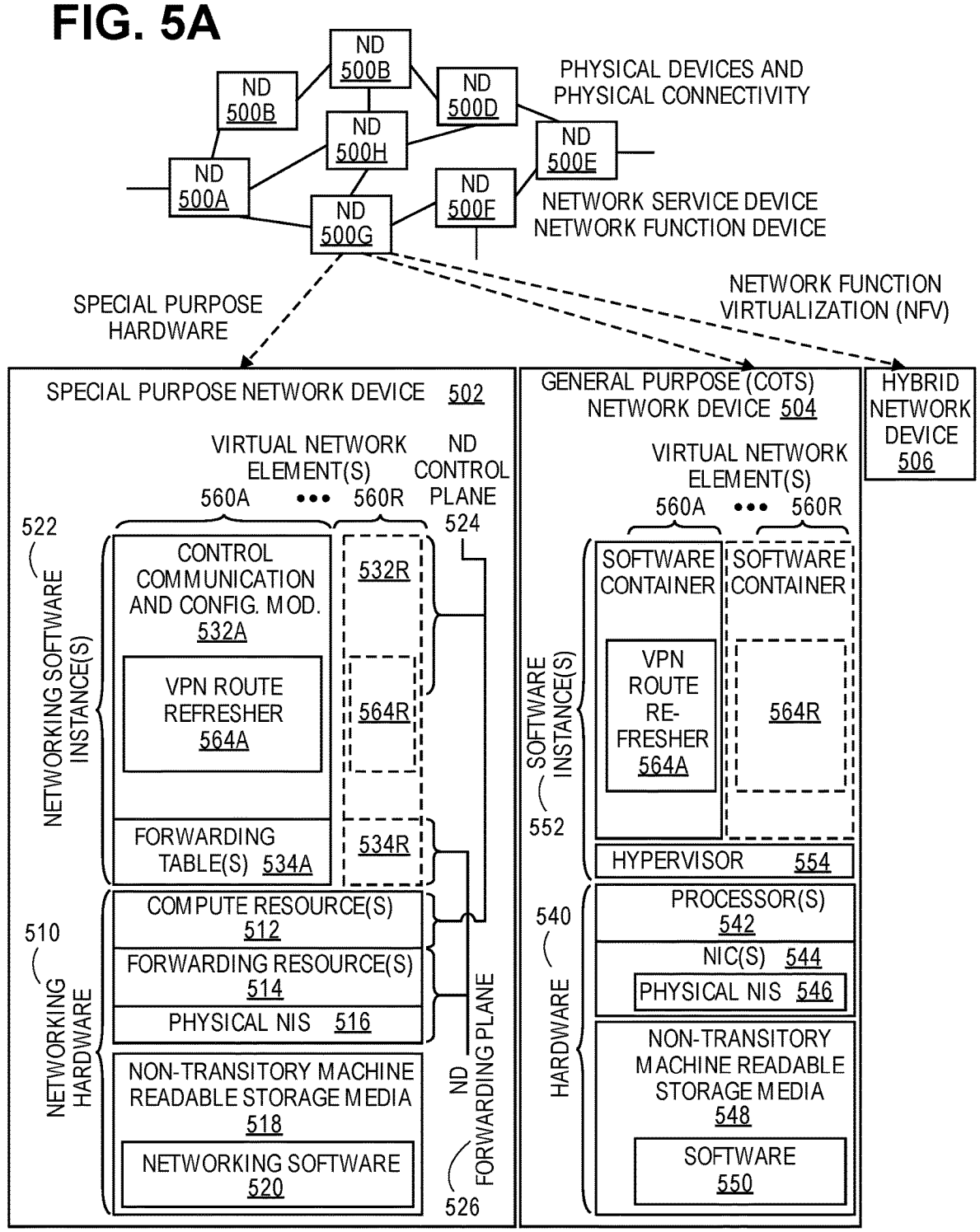
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media

518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
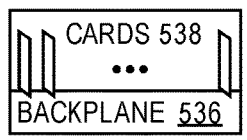
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R (e.g., VPN route refresher 564A-R). While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R, such as the VPN route refreshers 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R (i.e., VPN route refresher 564A-R) is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, such as VPN route refreshers 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The VPN route refreshers 564A-R perform the operations of the embodiments described herein above to optimize the VPN route refresh by reducing the number of VPN databases to be accessed and traversed by the route refresh process. The RT-RD map and the RD cache can be stored in the non-transitory machine readable storage media 518 or 548 along with code for the VPN route refresher 564A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the NIC(s) 544, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
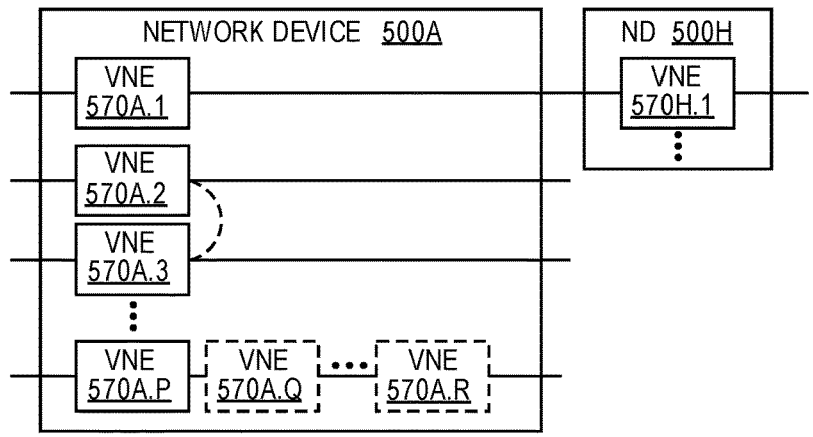
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
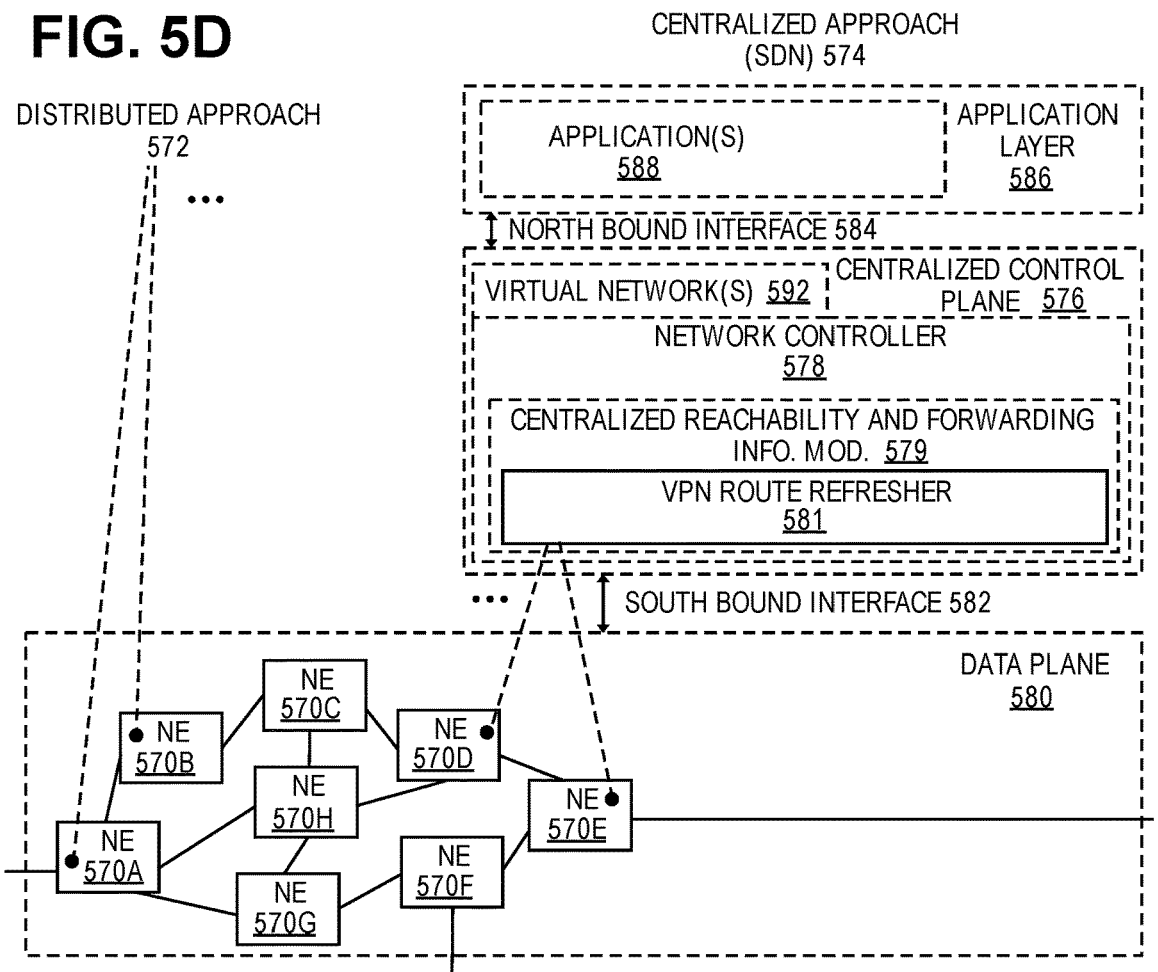
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

In some embodiments, the applications 588 may include the VPN route refreshers 581 that perform the operations of the embodiments described herein above to optimize the VPN route refresh by reducing the number of VPN databases to be accessed and traversed by the route refresh process. The RT-RD map and the RD cache can be stored in the non-transitory machine readable storage media accessible to the applications 588 along with code for the VPN route refresher. In other embodiments, the VPN route refresher 581 is implemented at the centralized control plane 576.

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
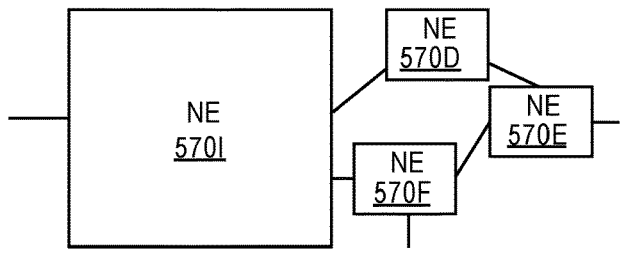
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
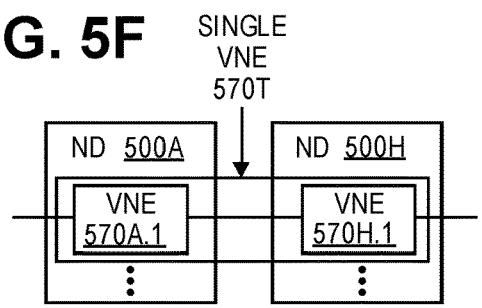
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
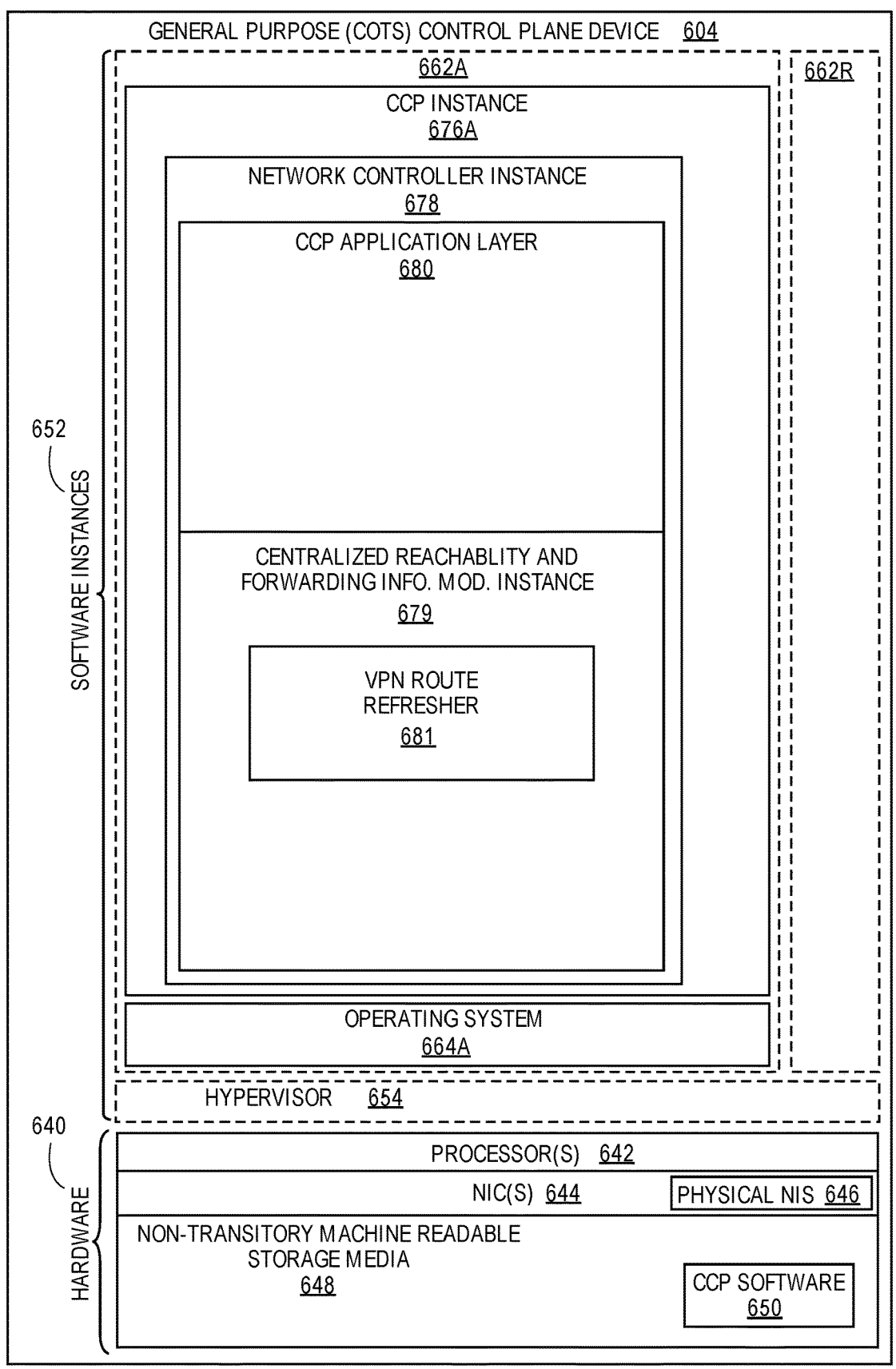
FIG. 6 illustrates a general purpose control plane device with centralized control plane (CCP) software 650), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (WM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view.

The VPN route refreshers 681 can be implemented in the CCP application layer 680 or at the centralized reachability and forwarding instance 679 and perform the operations of the embodiments described herein above to optimize the VPN route refresh by reducing the number of VPN databases to be accessed and traversed by the route refresh process. The RT-RD map and the RD cache can be stored in the non-transitory machine readable storage media 648 along with code for the VPN route refresher 681.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device, the method to optimize an operation of a virtual private network (VPN) route refresh for border gateway protocol (BGP), the method to reduce a span of VPN databases to be traversed to perform the VPN route refresh at the network device, the method comprising:
   receiving a route target constraint (RTC) add or delete from a BGP peer;
   looking up each route target (RT) in a route target route distinguisher (RT-RD) map to get a set of route distinguishers (RDs); and
   generating a VPN update for each VPN Address Family (AF) and each RD in an RD cache and sending the VPN update to a respective BGP peer;
the method further comprising:
   adding the RTC add or delete to a timer; and
   performing an update transaction when the timer expires.

2. The method of claim 1, further comprising:
   updating a RT filter for each peer affected by the RTC add or delete.

3. The method of claim 1, further comprising:
   identifying a changeset for each RT filter of each BGP peer.

4. The method of claim 1, further comprising:
   adding a set of RDs to an RD cache of a respective BGP peer.

5. A network device to optimize an operation of a virtual private network (VPN) route refresh for border gateway protocol (BGP), the network device to reduce a span of VPN databases to be traversed to perform the VPN route refresh at the network device, the network device comprising:
   a non-transitory computer readable medium having stored therein a VPN route refresher; and
   a processor coupled to the non-transitory computer readable medium, the processor to execute the VPN route refresher, the VPN route refresher to receive a route target constraint (RTC) add or delete from a BGP peer, to look up each route target (RT) in a route target-route distinguisher (RT-RD) map to get a set of route distinguishers (RDs), and to generate a VPN update for each VPN Address Family (AF) and each RD in an RD cache and sending the VPN update to a respective BGP peer,
   wherein the VPN route refresher is further to add the RTC add or delete to a timer, and to perform an update transaction when the timer expires.

6. The network device of claim 5, wherein the VPN route refresher is further to update a RT filter for each peer affected by the RTC add or delete.

7. The network device of claim 5, wherein the VPN route refresher is further to identify a changeset for each RT filter of each BGP peer.

8. The network device of claim 5, wherein the VPN route refresher is further to add a set of RDs to an RD cache of a respective BGP peer.

9. A computing device implementing a plurality of virtual machines for implementing network function virtualization (NFV), wherein a virtual machine from the plurality of virtual machines is configured to execute a method to optimize an operation of a virtual private network (VPN) route refresh for border gateway protocol (BGP), the computing device to reduce a span of VPN databases to be traversed to perform the VPN route refresh at the computing device, the computing device comprising:
   a non-transitory computer readable medium having stored therein a VPN route refresher; and
   a processor coupled to the non-transitory computer readable medium, the processor to execute the virtual machine from the plurality of virtual machines, the virtual machine to execute the VPN route refresher, the VPN route refresher to receive a route target constraint (RTC) add or delete from a BGP peer, to look up each route target (RT) in a route target-route distinguisher (RT-RD) map to get a set of route distinguishers (RDs), and to generate a VPN update for each VPN Address Family (AF) and each RD in an RD cache and sending the VPN update to a respective BGP peer,
   wherein the VPN route refresher is further to add the RTC add or delete to a timer, and to perform an update transaction when the timer expires.

10. The computing device of claim 9, wherein the VPN route refresher is further to update a RT filter for each peer affected by the RTC add or delete.

11. The computing device of claim 9, wherein the VPN route refresher is further to identify a changeset for each RT filter of each BGP peer.

12. The computing device of claim 9, wherein the VPN route refresher is further to add a set of RDs to an RD cache of a respective BGP peer.

13. A control plane device configured to implement at least one centralized control plane for a software defined networking (SDN) network, the centralized control plane configured to execute a method to optimize an operation of a virtual private network (VPN) route refresh for border gateway protocol (BGP), the control plane device to reduce a span of VPN databases to be traversed to perform the VPN route refresh at the control plane device, the control plane device comprising:

a non-transitory computer readable medium having stored therein a VPN route refresher; and a processor coupled to the non-transitory computer readable medium, the processor to execute the VPN route refresher, the VPN route refresher to receive an RTC add or delete from a BGP peer, to look up each route target (RT) in a route target-route distinguisher (RT-RD) map to get a set of route distinguishers (RDs), and to generate a VPN update for each VPN Address Family (AF) and each RD in an RD cache and sending the VPN update to a respective BGP peer, wherein the VPN route refresher is further to add the RTC add or delete to a timer, and to perform an update transaction when the timer expires.

14. The control plane device of claim 13, wherein the VPN route refresher is further to update a RT filter for each peer affected by the RTC add or delete.

15. The control plane device of claim 13, wherein the VPN route refresher is further to identify a changeset for each RT filter of each BGP peer.

16. The control plane device of claim 13, wherein the VPN route refresher is further to add a set of RDs to an RD cache of a respective BGP peer.

\* \* \* \* \*